H. LOBEL.
SELF CLEANING GROUTER FOR TRACTOR WHEELS.
APPLICATION FILED MAY 12, 1919.
1,319,231.
Patented Oct. 21, 1919.
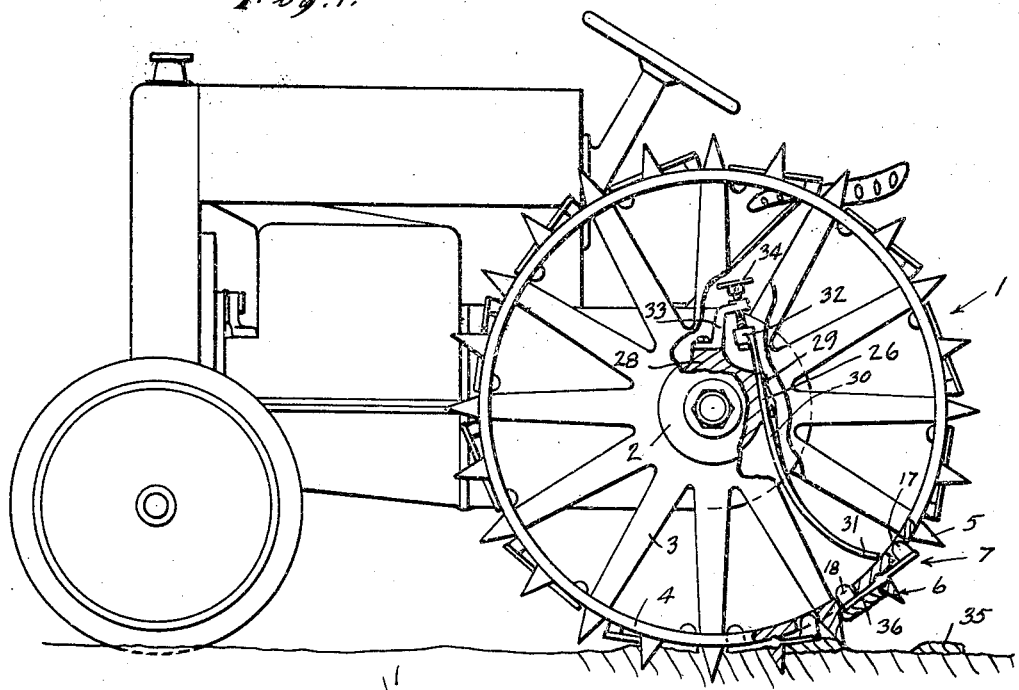
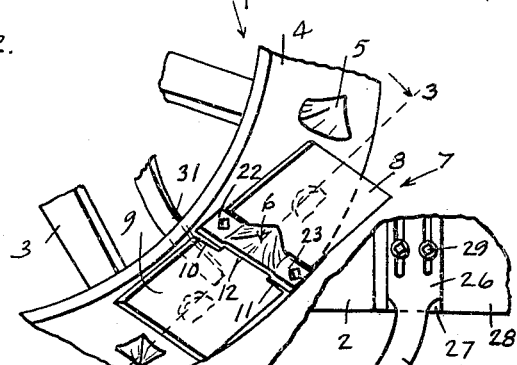
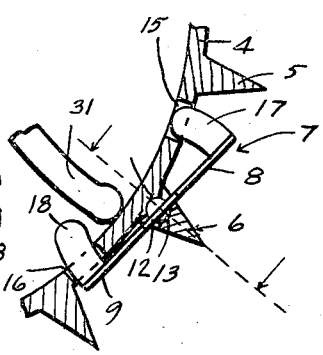
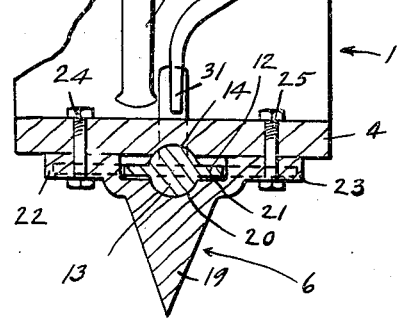
INVENTOR.
Herman Lobel,
BY
Hazard & Miller
ATTORNEYS.

UNITED STATES PATENT OFFICE.

HERMAN LOBEL, OF LOS ANGELES, CALIFORNIA, ASSIGNOR OF ONE-HALF TO LEONARD M. ALLEN, OF LOS ANGELES, CALIFORNIA.

SELF-CLEANING GROUTER FOR TRACTOR-WHEELS.

1,319,231.   Specification of Letters Patent.   Patented Oct. 21, 1919.

Application filed May 12, 1919. Serial No. 296,593.

*To all whom it may concern:*

Be it known that I, HERMAN LOBEL, a citizen of the United States, residing at Los Angeles, in the county of Los Angeles and State of California, have invented new and useful Improvements in Self-Cleaning Grouters for Tractor-Wheels, of which the following is a specification.

My object is to make a self-cleaning grouter for tractor wheels, and my invention consists of the novel features herein shown, described and claimed.

Figure 1 is a side elevation of a tractor provided with a self-cleaning grouter in accordance with the principles of my invention.

Fig. 2 is a fragmentary perspective of the periphery of a tractor wheel and showing the self-cleaning grouter in operation.

Fig. 3 is a fragmentary sectional detail substantially on the line 3—3 of Fig. 2.

Fig. 4 is an enlarged fragmentary cross section on the line 4—4 of Fig. 3 and looking in the direction indicated by the arrows.

The tractor drive wheel 1 has a solid hub 2, spokes 3 radiating from the hub, and the flat rim 4 at the outer ends of the spokes. Grouters 5 extend outwardly from the rim 4 at the opposite side and directly in line with the spokes 3. The grouters 6 are mounted alternately between the grouters 5, said grouters 6 being built upon the rim. The cleaners 7 are flat plates having ends 8 on the rear sides of the grouters 6 and ends 9 on the front sides. Notches 10 and 11 are formed in the plates at their transverse centers and on opposite sides, thus leaving necks 12 connecting the ends 8 to the ends 9. Balls 13 are formed at the centers of the necks 12. Seats 14 are formed in the periphery of the rim 4 half way between the grouters 5, and openings 15 and 16 are formed through the rim 4 on each side of the seats 14. Cams 17 and 18 extend inwardly from the ends 8 and 9 through the openings 15 and 16. The cleaners 7 are placed with the balls 13 fitting the seats 14 and the cams 17 and 18 in the openings 15 and 16, and the grouters 6 are applied to hold the cleaners in place.

The grouters 6 comprise prongs 19 having ball seats 20 and recesses 21 and attaching flanges 22 and 23. The grouters are placed in position with the balls 13 fitting in the ball seats 20 and bolts 24 and 25 are inserted through the rim 4 and through the attaching flanges 22 and 23. The cleaners 7 will oscillate upon the balls 13 as a pivot so that the ends 8 and 9 will move to and from the periphery of the rim 4.

A slotted plate 26 fits in a slideway 27 formed in the axle housing 28 and is secured in place by cap screws 29, so that the plate may be moved up and down by manipulating the screws. An arm 30 extends downwardly from the plate 26 and is offset outwardly and has a finger 31 in the plane of the travel of the cams 17 and 18, so that as the tractor wheel rotates to drive the tractor forwardly the finger 31 will pass successively over the cams 17 and 18 and oscillate the cleaners 7. A bearing arm 32 extends upwardly from the plate 26. A bearing bracket 33 is mounted upon the axle housing 28 and a handwheel screw 34 is screw seated through the bearing bracket 33 and swiveled in the bearing arm 32, so that when the cap screws 29 are loosened the screw 34 may be operated to move the plate 26 upwardly and move the finger 31 out of the path of the cams 17 and 18 so as to render the cleaners 7 inoperative.

The arm 30 is set in such a position as to bring the finger 31 into engagement with the cams 17 and 18 as the cleaners are leaving the ground, so that as the finger 31 passes the cam 17 the end 8 will be pressed outwardly to move the clog 35 from the rigid grouter 5 and then at the back side of the grouter 6 of the cleaner which is being operated, and then continued operation will cause the finger 31 to operate the cam 18 to move the clog 36 from the rigid grouter 5 at the other side of the grouter 6 of the cleaner which is being operated.

Thus I have produced a self-cleaning grouter for tractor wheels which is continually operated by the operation of the wheel and which is simple in construction and at the same time strong and durable and effective.

Various changes may be made without departing from the spirit of my invention as claimed.

I claim:

1. A self-cleaning grouter comprising the combination with a tractor wheel rim and two grouters projecting from the rim, of a cleaner pivotally mounted between the two grouters to oscillate to and from the rim, a cam extending from the cleaner through the rim, and means rigidly mounted to be engaged by the cam.

2. A self-cleaning grouter comprising the combination with a tractor wheel rim and two grouters extending from the rim, of a cleaner comprising a plate pivotally mounted between the two grouters, a third grouter mounted to form the pivot for the plate, cams extending from the ends of the plate through the rim, and a finger rigidly mounted in position to be engaged by the cams to oscillate the plate.

In testimony whereof I have signed my name to this specification.

HERMAN LOBEL.

Copies of this patent may be obtained for five cents each, by addressing the "Commissioner of Patents, Washington, D. C."